Dec. 23, 1941.  R. L. NEWCOMB  2,267,213
BUN BAKING MACHINE
Filed Sept. 16, 1940   2 Sheets-Sheet 1
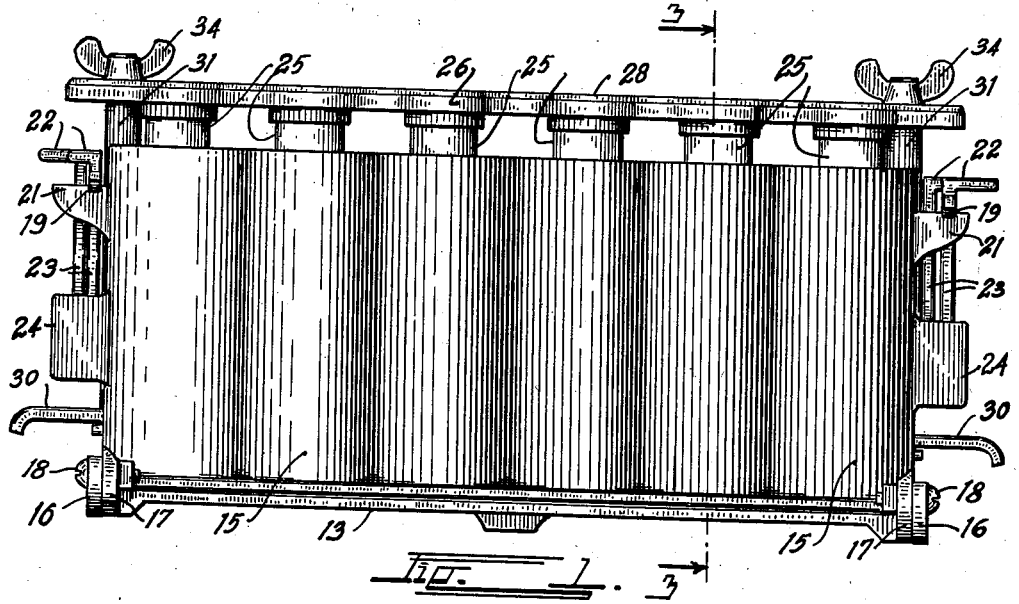
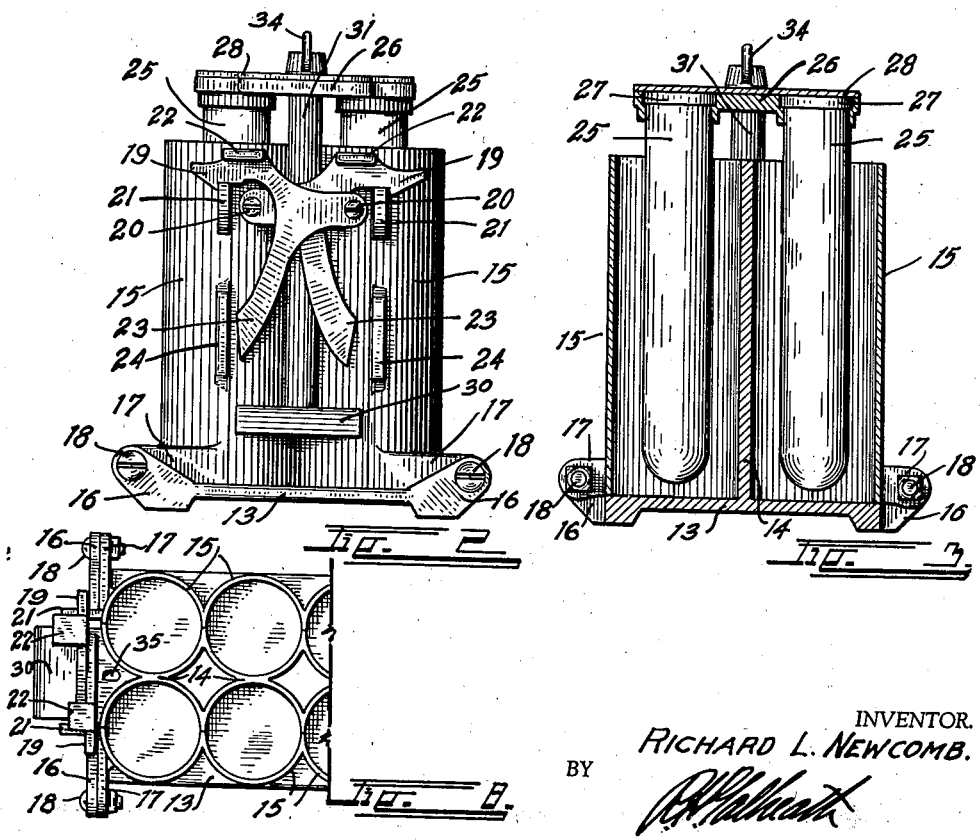
INVENTOR.
RICHARD L. NEWCOMB.
BY Dec. 23, 1941.  R. L. NEWCOMB  2,267,213
BUN BAKING MACHINE
Filed Sept. 16, 1940  2 Sheets—Sheet 2
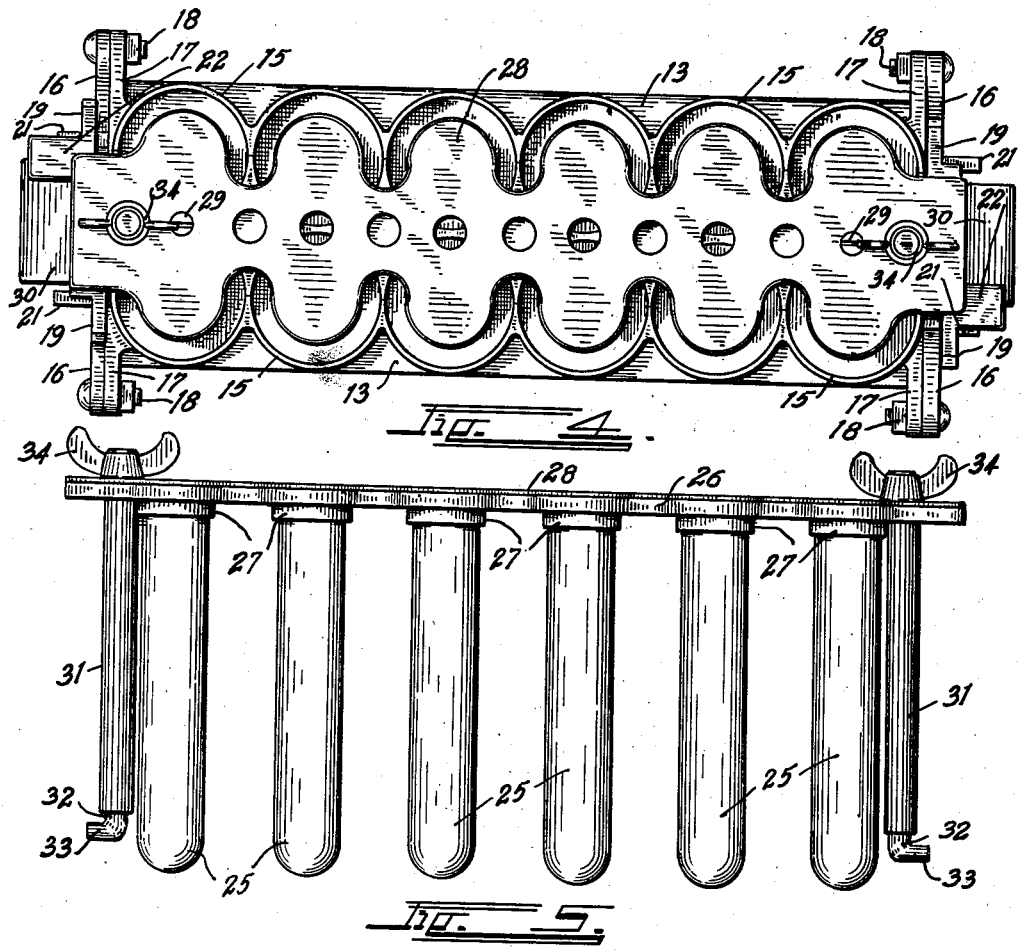
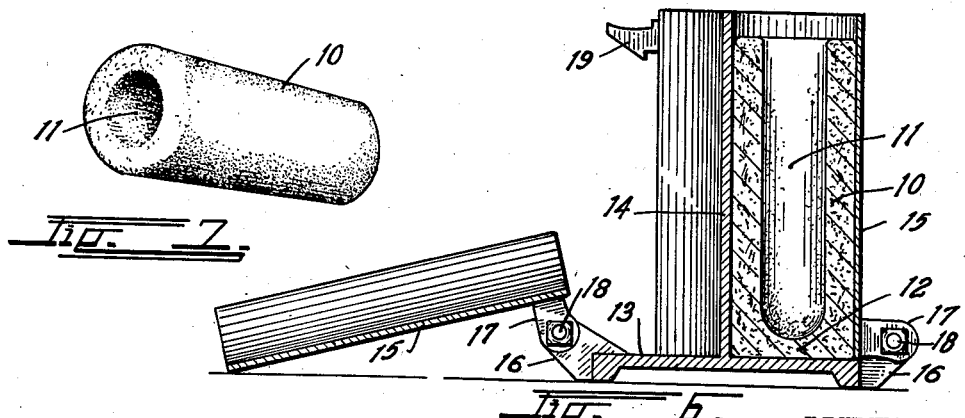
INVENTOR.
RICHARD L. NEWCOMB.
BY Patented Dec. 23, 1941

2,267,213

UNITED STATES PATENT OFFICE 2,267,213

BUN BAKING MACHINE

Richard L. Newcomb, Denver, Colo.

Application September 16, 1940, Serial No. 356,893

5 Claims. (Cl. 53—6)

This invention relates to a sandwich bun and to a baking pan for forming the improved sandwich bun.

The principal object of the invention is to provide a long, tubular, cup-like bun into which meats, frankfurters and other eatables can be placed and which will prevent spilling or dropping of the contents.

Other objects of the invention are to provide a baking pan for forming a bun of this type into which the dough can be easily placed and from which the baked buns can be easily removed; to provide a core member for forming a cavity in a bun which will not adhere to the dough and upon which the dough will not attach itself; and to provide a pan of this character which can be quickly and easily opened and closed while hot with a minimum of inconvenience.

Other objects and advantages reside in the detail construction of the invention, which is designed for simplicity, economy, and efficiency. These will become more apparent from the following description.

In the following detailed description of the invention reference is had to the accompanying drawings and throughout the description.

In the drawings:

Fig. 1 is a side view of the improved bun baking pan.

Fig. 2 is an end view thereof.

Fig. 3 is a cross section, taken on the line 3—3, Fig. 1.

Fig. 4 is a plan view thereof.

Fig. 5 is a detail view of the cavity forming insert employed in the improved pan.

Fig. 6 is a cross section through the pan with the cavity forming insert removed.

Fig. 7 is a detail, perspective view illustrating the appearance of the bun as formed in the pan.

Fig. 8 is a fragmentary plan view on a smaller scale with the cavity forming mechanism removed.

The improved bun comprises a cylindrical body or bun 10 into one extremity of which a cavity 11 extends. The cavity does not extend entirely through the bun, the latter being closed by means of a bottom portion 12 therein. The cavity is designed more particularly for receiving wieners or frankfurters for making the well-known "hot dog" sandwich. It can, of course, be filled with any suitable eatable material.

The pan for forming these buns comprises an elongated base plate 13. A grooved partition plate 14 extends longitudinally of the base plate 13 and is preferably cast or otherwise formed integrally therewith. The partition plate is formed with semi-circular, vertical grooves in both of its faces of a size and diameter to mould one-half of the buns 10.

The opposite halves thereof are moulded by means of hinged side plates 15 which are formed with semi-circular grooves in their inner faces registering with the grooves in the partition plates 14 to complete the bun molds. Any desired number of molds may be employed in the pan. As illustrated, there are twelve molds, six on each side of the partition plate 14. A flat hand grip 30 extends outward from each extremity of the partition plate 14.

A pair of stationary hinge ears 16 extend outwardly at each side of the base plate 13 at each extremity thereof. The side plates are formed with hinge arms 17 which lie against the ears 16 and are pivoted thereto by means of suitable pivot bolts 18. The bottom surfaces of the side plates are milled perfectly flat so that they will lie flat against the base plate to close the bottoms of the molds.

The side plates rest on the base plate by gravity but, to prevent the expansion of the dough from forcing these plates outwardly, a pair of hooked latches 19 are provided, there being one latch at the extremity of each side plate. The latches are pivoted on suitable pivot screws 20 at each extremity of the partition plate 14 and hook over latch lugs 21 formed on the extremities of the side plates 15. The latches are provided with outwardly extending grip pads 22 by means of which they may be lifted from their latch lugs. The lower extremities of the hooked latches are extended downward to form prying arms 23 which engage ears 24 on the extremities of the side plates 15 for the purpose of forcing or prying the latter outwardly.

Thus, when the grip pads 22 are lifted or struck upwardly, they first release the latches 19 and thence throw the side plates outwardly to the position of Fig. 6 without it being necessary for the operator to pull the plates open.

The openings in the buns are moulded by a series of smooth, cylindrical core forms 25 of porcelain, glass, or similar refractory material. The core forms are suspended from a core plate 26. Each of the forms has a supporting flange 27 formed about its upper extremity which supports it in a counter-bore in the plate 26. The forms are held in place in the plate by means of a removable top plate 28 attached to the plate 26 by means of suitable attachment screws 29. Thus if any of the forms become broken, they can be quickly and easily removed or replaced by simply removing the top plate 28.

The core plate is supported from the hand grips 30 upon suitable spacing sleeves 31. The spacing sleeves surround locking key rods 32 which terminate at their lower extremities in angular turned keys 33 and at their upper extremities in thumb grips 34 by means of which they may be rotated. The lower extremities of the rods 32 enter key holes 35 in the hand grips 30 in which they may be turned to prevent the pressure of the dough in the molds from forcing the core plate 26 upwardly.

In use, the baker closes the molds and, with the core plate removed, places a pre-weighed amount of dough in each mold. He then puts the core plate in position with one of the core forms 25 in each mold and forces the plate downwardly to indent the forms into the dough. The plate is locked in its downward position by a quarter turn rotation of the thumb grips 34. The dough is allowed to raise in the molds a pre-determined amount and the pans are then placed in an oven for baking.

After the baking has been completed, the pan is removed. The core forms are released and lifted from the molds. The grip pads 22 are struck upwardly by any suitable implement or by the hands to throw the two side plates outwardly. The buns usually fall outwardly with the side plates, but if not, they can be easily withdrawn from the partition plate 14. The side plates are then thrown closed for another filling.

A large number of different types of materials were tried for the core forms but it was found that they either carried too much heat to the interior so as to burn or toast the buns or they became so attached thereto that they could not be withdrawn. The only materials which were found satisfactory for this purpose were "Pyrex" glass, heat resisting porcelain, or similar refractory material.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A pan for baking hollow buns comprising: a base plate; a longitudinally extending partition member along said base plate, said member having vertical, semi-circular grooves along its opposite faces; a pair of side plates, each of said side plates having similar grooves along its inner face; and means for holding said side plates against said partition member to form a plurality of mold cavities.

2. A pan for baking hollow buns comprising: a base plate; a longitudinally extending partition member along said base plate, said member having vertical, semi-circular grooves along its opposite faces; a pair of side plates, each of said side plates having similar grooves along its inner face; means for holding said side plates against said partition member to form a plurality of mold cavities; a core plate extending along and above said partition member; and a plurality of core forms extending downwardly from said core plate into said molds and terminating above the bottoms thereof.

3. A pan for baking hollow buns comprising: a base plate; a longitudinally extending partition member along said base plate, said member having vertical, semi-circular grooves along its opposite faces; a pair of side plates, each of said side plates having similar grooves along its inner face; means for holding said side plates against said partition member to form a plurality of mold cavities; a core plate extending along and above said partition member; a plurality of core forms extending downwardly from said core plate into said molds and terminating above the bottoms thereof; and latch means for locking said core plate in place.

4. A pan for baking hollow buns comprising: a base plate; a longitudinally extending partition member along said base plate, said member having vertical, semi-circular grooves along its opposite faces; a pair of side plates, each of said side plates having similar grooves along its inner face; and latch means for holding said side plates in position.

5. A pan for baking hollow buns comprising: a base plate; a longitudinally extending partition member along said base plate, said member having vertical, semi-circular grooves along its opposite faces; a pair of side plates, each of said side plates having similar grooves along its inner face; latch means for holding said side plates in position; and prying levers for forcing said side plates away from said partition member.

RICHARD L. NEWCOMB.